(12) United States Patent
Hashimoto et al.

(10) Patent No.: US 9,020,506 B2
(45) Date of Patent: Apr. 28, 2015

(54) BASE STATION CONTROLLER, BASE STATION AND COMMUNICATION METHOD

(75) Inventors: Masanori Hashimoto, Kawasaki (JP); Kayo Motohashi, Kawasaki (JP); Yasuo Tezuka, Kawasaki (JP); Nao Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 12/535,844

(22) Filed: Aug. 5, 2009

(65) Prior Publication Data

US 2010/0056145 A1 Mar. 4, 2010

(30) Foreign Application Priority Data

Aug. 26, 2008 (JP) .................... 2008-216061

(51) Int. Cl.
H04W 36/00 (2009.01)
H04W 88/12 (2009.01)
H04W 36/10 (2009.01)

(52) U.S. Cl.
CPC .............. H04W 88/12 (2013.01); H04W 36/10 (2013.01)

(58) Field of Classification Search
USPC ......... 455/444, 436, 437, 438, 439, 440, 441, 455/442, 443, 422.1, 435.1, 435.2, 435.3, 455/524, 525, 560, 561; 370/331, 328, 332
See application file for complete search history.

(56) References Cited

U.S. PATENT DOCUMENTS

| | | | |
|---|---|---|---|
| 5,889,770 A * | 3/1999 | Jokiaho et al. ............. | 370/337 |
| 2001/0023191 A1 * | 9/2001 | Endo ............................ | 455/560 |
| 2003/0171124 A1 | 9/2003 | Kataoka | |
| 2003/0224795 A1 | 12/2003 | Wilhoite et al. | |
| 2005/0009528 A1 * | 1/2005 | Iwamura et al. ............. | 455/446 |
| 2005/0148368 A1 | 7/2005 | Scheinert et al. | |
| 2007/0037577 A1 * | 2/2007 | Dalsgaard et al. ........... | 455/436 |
| 2007/0293222 A1 * | 12/2007 | Vikberg et al. ............... | 455/436 |
| 2008/0051088 A1 | 2/2008 | Tariq et al. | |
| 2008/0090571 A1 * | 4/2008 | Kwong ......................... | 455/436 |
| 2008/0318582 A1 * | 12/2008 | Moon et al. .................. | 455/446 |
| 2009/0310532 A1 * | 12/2009 | Neil .............................. | 370/328 |
| 2010/0135250 A1 * | 6/2010 | Ishii et al. .................... | 370/331 |

FOREIGN PATENT DOCUMENTS

| | | |
|---|---|---|
| JP | 8-265822 | 10/1996 |
| WO | 02/104056 | 12/2002 |

OTHER PUBLICATIONS

European Search Report dated Dec. 12, 2012, from corresponding European Application No. 09167118.0.

(Continued)

*Primary Examiner* — Michael Faragalla
*Assistant Examiner* — Gerald Oliver
(74) *Attorney, Agent, or Firm* — Katten Muchin Roseman LLP

(57) ABSTRACT

A base station controller that manages a plurality of cells includes a receiving part configured to receive, from another base station controller that manages a cell sharing a communication area with each of the plurality of cells, identification information of a cell group to which a cell formed by a base station of connection destination candidate of a mobile station connected to a base station under control of the another base station controller belongs, and a control part configured to exercise control to transmit a message requesting connection to the mobile station to each base station forming the cells contained in the cell group.

9 Claims, 18 Drawing Sheets

(56) References Cited

OTHER PUBLICATIONS

Notification of Reason(s) for Refusal dated Jul. 3, 2012, from corresponding Japanese Application No. 2008-216061.
Huawei. "UE Access Control and UE Registration" 3GPP TSG RAN WG3 meeting #61, R3-082028, Aug. 18-22, 2008.

Nokia Siemens Networks, Nokia. "Mobility Procedures for HeNB deployment scenarios" 3GPP TSG-RAN WG3 #60, R3-081286, May 5-9, 2008.
Huawei. "Discussion on C-Plane handling for Home eNB" 3GPP TSG RAN WG3 Meeting #61, R3-081877, Aug. 18-22, 2008.

* cited by examiner

FIG. 8

| FEMTOCELL NUMBER | FEMTOCELL GROUP NAME | REGISTERED TERMINAL (UE) |
|---|---|---|
| C11 | GrA | N1 |
| C12 | GrA | N2 |
| C13 | GrA | N3 |
| C14 | GrA | N4 |
| C21 | GrB | N5 |
| C22 | GrB | N6 |
| C23 | GrB | N7 |
| C24 | GrB | N8 |
| C25 | GrB | N9 |

FIG. 16

| FEMTOCELL NUMBER | FEMTOCELL GROUP NAME |
|---|---|
| C11 | GrA |
| C12 | GrA |
| C13 | GrA |
| C14 | GrA |
| C21 | GrB |
| C22 | GrB |
| C23 | GrB |
| C24 | GrB |
| C25 | GrB |

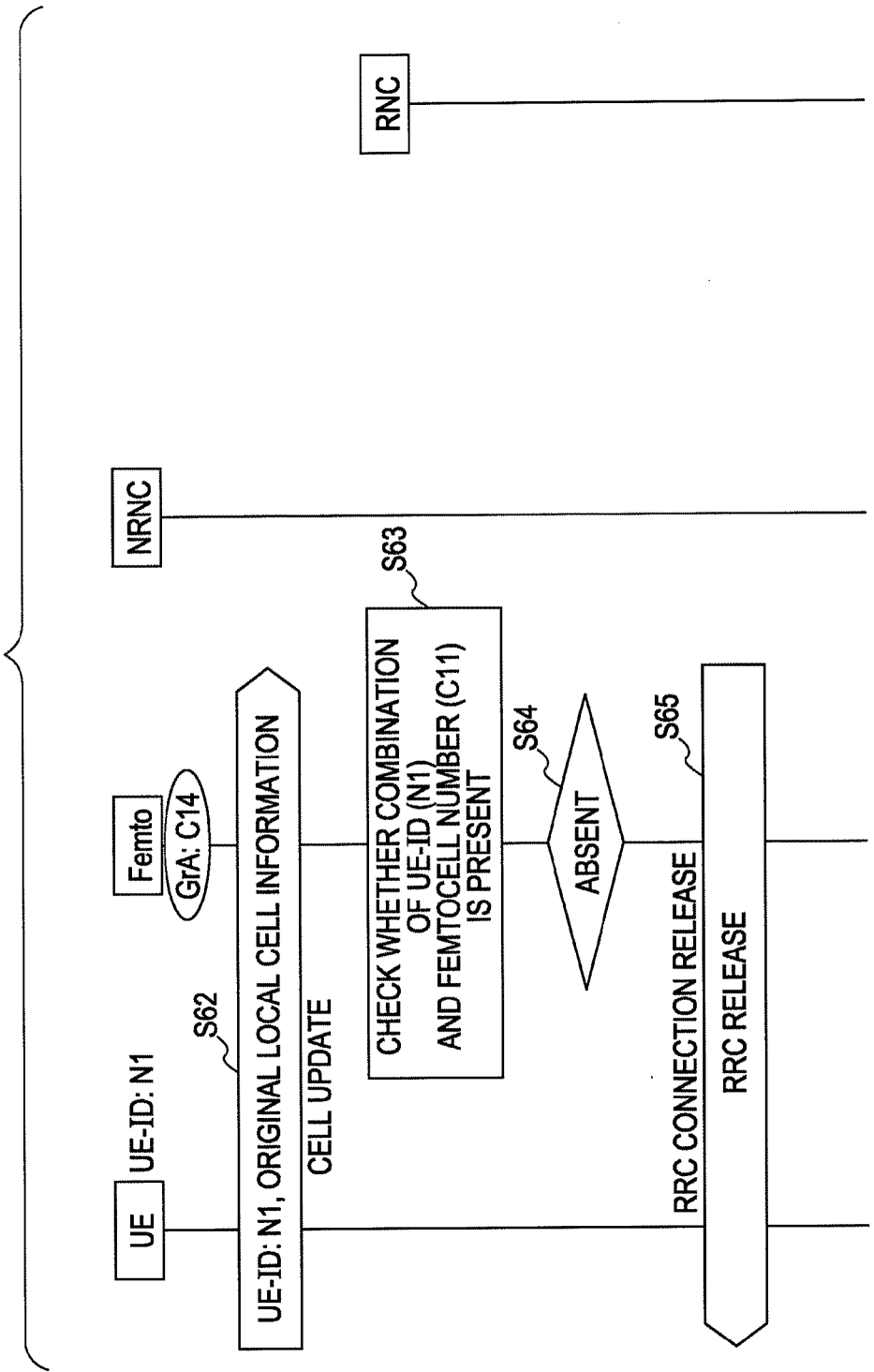

BASE STATION CONTROLLER, BASE STATION AND COMMUNICATION METHOD

CROSS-REFERENCE TO RELATED APPLICATIONS

This application is based upon and claims the benefit of priority of the prior Japanese Patent Application No. 2008-216061, filed on Aug. 26, 2008, the entire contents of which are incorporated herein by reference.

FIELD

The present invention relates to switching connections between a mobile station and base stations in mobile radio communication.

BACKGROUND

In a mobile radio communication system, communication can be continued without interruption by performing a handover between a mobile station and a network when the mobile station moves between base stations.

Here, the handover is a technology by which a mobile station performing communication with some base station changes the communication partner when the distance to the base station increases (the receiving level from the base station decreases) and the distance to another base station decreases (the receiving level from the other base station increases). Thus, the mobile station constantly measures the radio environment to search for a base station with which communication can be performed with better transmission quality.

A communication area covered by one base station is normally an area of several km in radius and a plurality of base stations is set up in such a way that communication areas thereof are adjacent to each other without gaps. A communication area covered by one base station may be called a cell, and particularly, a communication area of the above size may be called a macro cell.

A method of setting up macro cells to cover a communication area is considered to be effective in terms of cost because a wide range can be covered by a small number of base stations. On the other hand, when communication is performed using a relatively high frequency band such as the 2 GHz band, there is a problem that conditions in which radio waves do not reach areas behind buildings, indoors, and underground are more likely to arise.

Thus, an attempt has been made to solve the above problem by further setting up, in a communication area of a macro cell, a base station (for example, an indoor base station) covering a communication area whose range is smaller than that of the macro cell. The cell covering a communication area smaller than that of a macro cell may be called a micro cell or pico cell. For example, a handover when a macro cell and a micro cell or pico cell are used with an overlapped communication area is disclosed by International Publication Pamphlet No. WO 2002/104056 and Japanese Patent No. 2693924.

An ultra-small cell, also called a femtocell, forms a cover area still smaller than that of a micro cell or pico cell. The communication area covered by a femtocell is about 10 m in radius, which is particularly suitable for covering a narrow indoor area, for example, an area of a home.

When a femtocell is set up indoors, for example in a home, a broadband line such as ADSL and FTTH can be used for the connection between a base station and a core network and thus, there may be no need to set up a dedicated line used normally between a base station and a core network so that infrastructure costs can be reduced.

When a mobile station performs a handover from a macro cell to a femtocell, the mobile station searches for a communicable femtocell located within the range of the macro cell.

When the search for a femtocell is being conducted, the base station forming the macro cell repeatedly notifies the mobile station of information (broadcast information) about cell synchronization in a specific short period. Here, information contained in the broadcast information includes an operator code, cell ID, information serving as criteria for determining cell communication quality measurement, adjacent cell information (a cell frequency, cell ID, and the like) and the like.

If, on the other hand, a plurality of femtocells equal to or greater than a certain number is present in a macro cell, the base station forming the macro cell may not be able to transmit broadcast information about all of the plurality of femtocells in the specific period. If a notification period is set longer in accordance with the amount of information transmitted by the base station forming the macro cell, it takes an accordingly longer period for the mobile station to receive information used for handover so that communication may be cut off by exceeding the timing at which a handover can be performed.

SUMMARY

According to an aspect of the invention, a base station controller that manages a plurality of cells includes a receiving part configured to receive, from another base station controller that manages a cell sharing a communication area with each of the plurality of cells, identification information of a mobile station connected to a base station under control of the another base station controller and identification information of a cell group to which a cell, among the plurality of cells, formed by a base station as a connection destination candidate of the mobile station belongs; and a control part configured to determine a cell, among the plurality of cells, belonging to the cell group determined by the cell group identification information and formed by a base station permitting connection to the mobile station based on the identification information of the mobile station, and exercise control to allow transmission of a message, requesting connection to the mobile station, to the base station forming the determined cell.

According to an aspect of the invention, a base station that forms one of a plurality of cells managed by a base station controller includes a receiving part configured to receive, from the base station controller, identification information of a mobile station connected to a base station under control of another base station controller that manages a cell sharing a communication area with each of the plurality of cells; and a control part configured to determine the mobile station to which a local station permits connection based on the identification information of the mobile station, and to exercise control to transmit a message of notification that connection is permitted to the determined mobile station to the another base station controller via the base station controller.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of a correspondence table stored by the NRNC in a first embodiment and a modification of the first embodiment;

FIG. 16 illustrates an example of the correspondence table stored by the NRNC in a second embodiment and a modification of the second embodiment;

FIG. 19 illustrates the Cell Update flow (when the Cell Update is successful) in the modification of the second embodiment.

DESCRIPTION OF EMBODIMENTS

An embodiment of the present invention will be described with reference to the drawings.

The present embodiment illustrates an example of the application of a handover between a macro cell and a femtocell, but is not limited to this and may generally be applied to handovers between cells sharing a communication area such as macro cells and pico cells.

(1) Communication System Example to which an Embodiment is Applied

Figure 1:
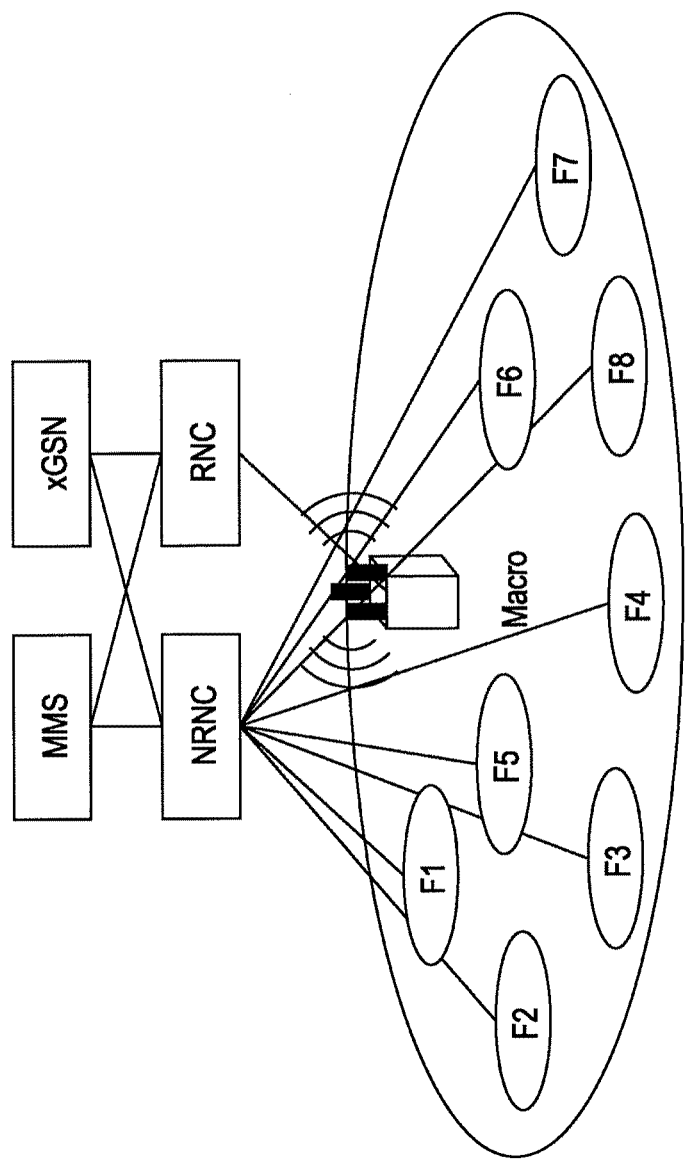
FIG. 1 illustrates an example of a communication system to which an embodiment of the present invention is applied.

FIG. 1 illustrates, as an example of the communication system to which an embodiment of the present invention is applied, a case in which a plurality of femtocells is present within an area of a macro cell.

In FIG. 1, the base station forming the macro cell is controlled by a Radio Network Controller (RNC) and base stations forming a plurality of femtocells F1 to F8 located within the macro cell are controlled by a New Radio Network Controller (NRNC). A base station forming a macro cell may be denoted below as a "macro cell base station" and a base station forming a femtocell as a "femtocell base station."

F1 to F8 are individual femtocells, and the macro cell base station repeatedly transmits broadcast information about F1 to F8 in a specific period to a mobile station.

If as many femtocells as a specific number or more (for example, 33 or more) are present within the macro cell, the macro cell base station may not be able to transmit broadcast information about all the femtocells within the specific period. A mobile station searches for a handover destination cell based on the broadcast information about the femtocells and thus, if broadcast information about all the femtocells cannot be obtained, the handover from the macro cell to a femtocell may not be performed smoothly.

Therefore, the macro cell base station divides the femtocells present in the macro cell into a plurality of groups to manage the femtocells, and transmits broadcast information about each group to the mobile station, assuming that the broadcast information about the femtocells in the given group is the same.

The number of femtocells contained in each group can be balanced when grouping femtocells by, for example, sequentially attaching the group number in order of setting up. When the number of femtocells present in the macro cell is relatively small, the femtocells can be grouped in such a way that adjacent femtocells belong to different femtocell groups.

Figure 2:
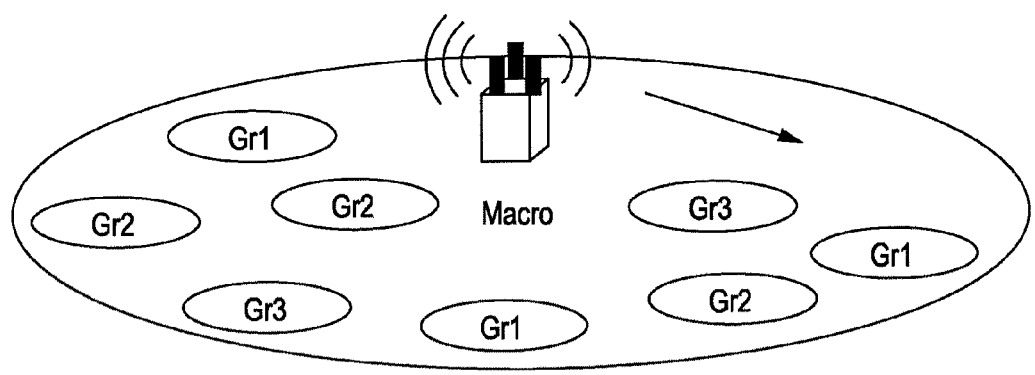
FIG. 2 illustrates an example of a communication system in which a plurality of femtocells present in a macro cell is managed in groups.

FIG. 2 illustrates a communication system in which the macro cell base station manages eight femtocells present in the macro cell by dividing the femtocells into three groups: Gr1, Gr2, and Gr3.

In the communication system in FIG. 2, broadcast information sent from the macro cell base station to a mobile station contains information about femtocell groups Gr1, Gr2, and Gr3. Information about cell groups contained in the broadcast information may include, for example, the operator code, cell group ID, which is identification information of each cell group, information to be a reference for determining communication quality measurement of a cell group, and the frequency of a cell group.

In the above case, if the number of femtocell groups is equal to or less than a certain number (for example, 32 or less), broadcast information about all femtocell groups can be sent from the macro cell base station to a mobile station.

However, if the mobile station that has received broadcast information requests a handover to a femtocell belonging to a femtocell group, the network side can identify the femtocell group requested by the mobile station as a handover destination, but it is difficult to identify which femtocell belongs to the femtocell group. Thus, also in this case, a mobile station may not be able to perform a handover smoothly from the macro cell to a femtocell.

In an operation of femtocells, a case in which users permitted to connect to the base station of a femtocell are limited (for example, when set up in a home), and a case in which users permitted to connect to the base station of a femtocell are not limited (for example, when set up in a public place such as a coffee shop) are assumed.

Figure 3:
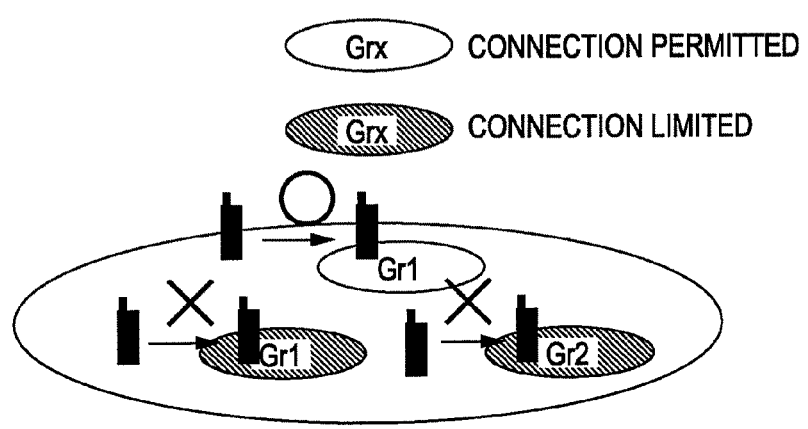
FIG. 3 illustrates an example of handovers accompanying movements from the macro cells to certain femtocells.

Here, three cases illustrated in FIG. 3 can be considered for a handover accompanying the movement from the macro cell to a femtocell.

Movements from the macro cell 1) to a femtocell formed by a base station to which connection is permitted (including a case in which there is no connection limitation), 2) to a femtocell formed by a base station to which connection is limited and belonging to the same group (for example, Gr1)

as a femtocell formed by a base station to which connection is permitted, and 3) to a femtocell formed by a base station to which connection is limited and belonging to a group (for example, Gr2) different from a group to which a femtocell formed by a base station to which connection is permitted belongs, may be considered.

The network side cannot identify whether a handover of a mobile station from the macro cell is a case of 1) or a case of 2). That is, the network side cannot identify whether connection of the mobile station to each of the femtocell base stations belonging to the same group is permitted. Thus, the mobile station may not be able to perform a handover smoothly.

Thus, according to an aspect of the present embodiment, the network side is enabled to identify each femtocell belonging to each femtocell group so that whether the connection of a mobile station requesting connection to some femtocell base station and the femtocell base station is permitted can be determined.

According to another aspect of the present embodiment, a femtocell base station notified of a connection request from a mobile station via a network is enabled to determine whether the connection between the local station and the mobile station is permitted.

According to the present embodiment, when a mobile station moves between cells sharing a communication area, the connection can be switched smoothly between base stations.

Figure 4:
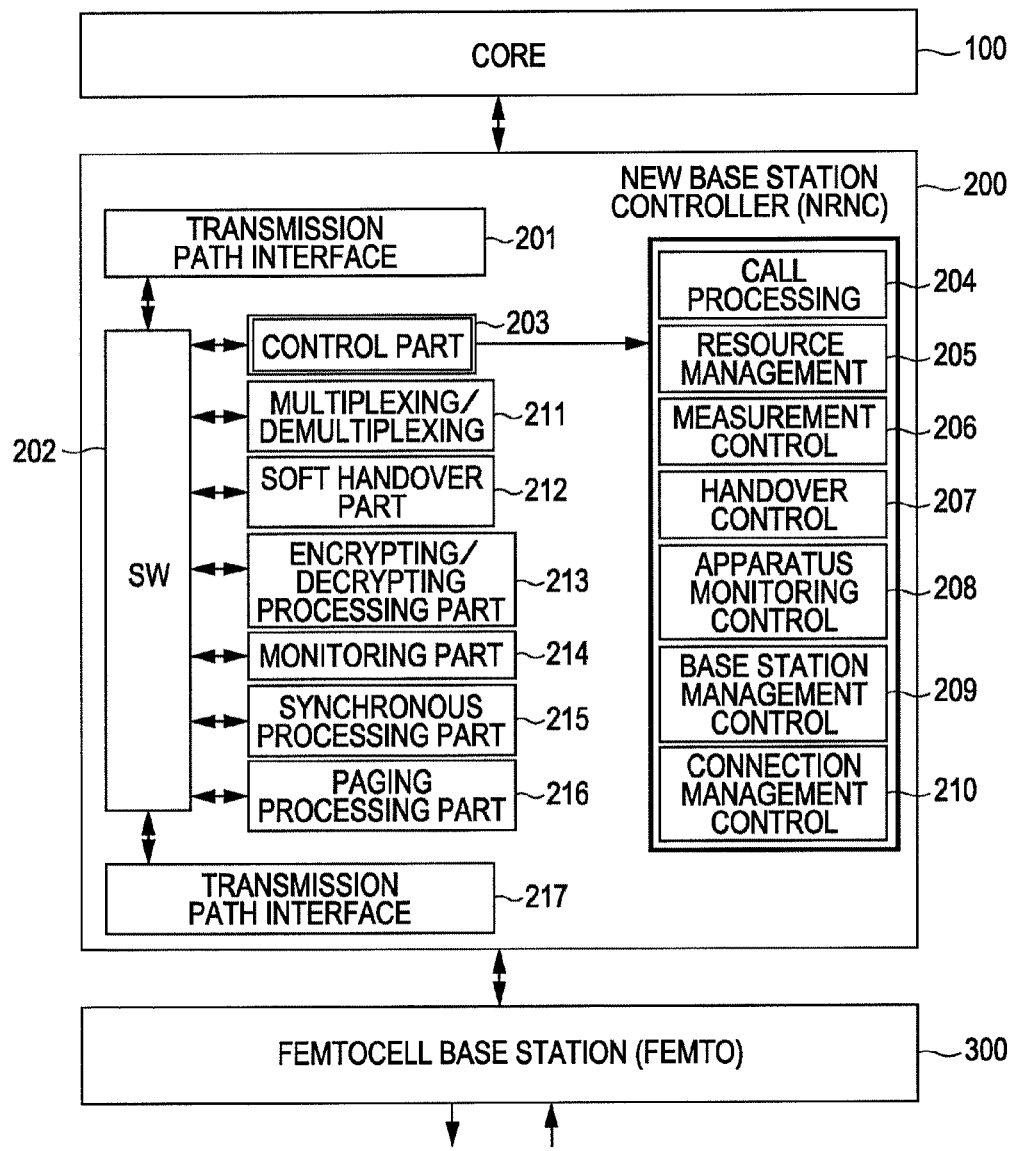
FIG. 4 illustrates an example of a new base station controller (NRNC) used in the present embodiment.

(2) Layout Diagram Used in the Present Embodiment (a) Example of the Base Station Controller FIG. 4 illustrates an example of a new base station controller (NRNC) used in the present embodiment.

In FIG. 4, reference numeral 100 is a core network, reference numeral 200 an NRNC, reference numerals 210 and 217 transmission path interfaces, reference numeral 202 a switch, reference numeral 203 a control part, reference numeral 211 a multiplexing/demultiplexing part, reference numeral 212 a soft handover part, reference numeral 213 an encrypting/decrypting processing part, reference numeral 214 a monitoring part, reference numeral 215 a synchronous processing part, reference numeral 216 a paging processing part, and reference numeral 300 a femtocell base station (Femto).

The transmission path interface 201 is an interface that performs transmission processing and reception processing of signals transmitted and received to and from the core network.

The switch 202 switches signals transmitted and received by the transmission path interface 201 or 217 to blocks that perform various kinds of processing.

The control part 203 includes a call processing function 204, a resource management part 205, a measurement control function 206 that provides signal measurement instructions and analyzes measurement results, a handover control function 207, an equipment monitoring control function 208, a base station management control function 209 that manages base stations under control of the local equipment, and a connection management control function 210 that manages connections between a mobile station and a base station under control of the local equipment.

The connection management control function 210 stores a correspondence table associating a communication area of the local equipment with identification information of each femtocell sharing the communication area, identification information of the femtocell group to which each femtocell belongs, and/or identification information of the mobile station permitted to connect to the base station forming each femtocell. Based on the correspondence table, the connection management control function 210 performs at least one process illustrated in FIG. 9 (S7), FIG. 12 (S21 and S22), FIG. 14 (S37 and S38), FIG. 17 (S52), and FIG. 18 (S50) described later.

The multiplexing/demultiplexing part 211 multiplexes logical channels into a transport channel and demultiplexes logical channels from a transport channel in a Media Access Control (MAC) layer.

The soft handover processing part 212 performs processing concerning a handover of a mobile station.

The encrypting/decrypting processing part 213 performs processing to encrypt/decrypt data transmitted and received by the base station controller.

The monitoring part 214 performs monitoring of traffic and/or cell states.

The synchronous processing part 215 manages timing for the transmission and reception of data.

The paging processing part 216 performs paging processing concerning call alert notification for mobile stations in each position registration area.

The transmission path interface 217 is an interface that performs transmission processing and reception processing of signals transmitted and received to and from a femtocell base station.

A base station controller (or RNC) to control the base station of a macro cell used in the present embodiment may include, for example, a function processing block like that in FIG. 4, and may also include, instead of the transmission path interface 217 for femtocell base stations, a transmission path interface for a macro cell base station. The RNC to control a macro cell base station may not include the connection management function of the control part 203 in FIG. 4.

(b) Example of the Base Station Equipment

Figure 5:
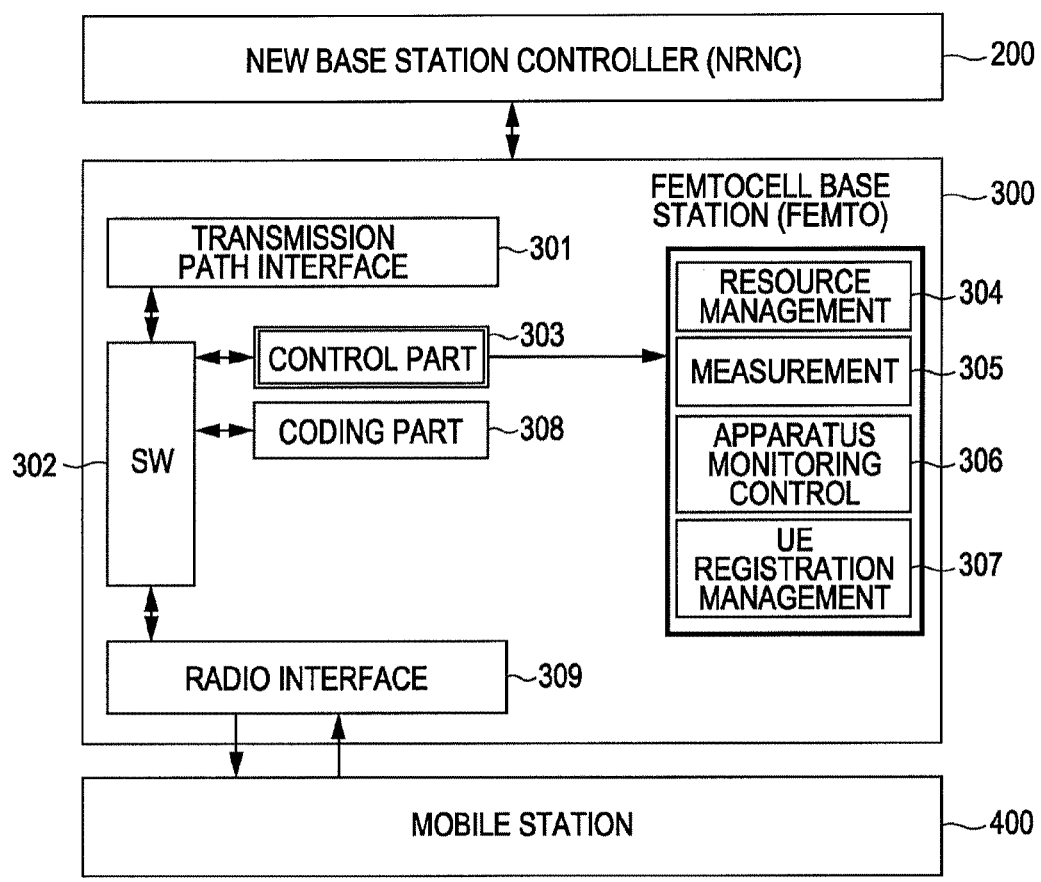
FIG. 5 illustrates an example of base station equipment used in the present embodiment.

FIG. 5 is an example of the femtocell base station equipment used in the present embodiment.

In FIG. 5, reference numeral 301 is a transmission path interface, reference numeral 302 a switch, reference numeral 303 a control part, reference numeral 308 an coding part, reference numeral 309 a radio interface, and reference numeral 400 a mobile station. The same reference numerals are attached to components with the same reference numerals in FIG. 4 and a description thereof is omitted.

The transmission path interface 301 is an interface that performs transmission processing and reception processing of signals transmitted and received to and from the NRNC 200.

The switch 302 switches signals transmitted and received by the transmission path interface 301 or the radio interface 309 to blocks that perform various kinds of processing.

The control part 303 includes a resource management function 304, a measuring function 305 to make signal measurements, and an equipment monitoring control function 306.

The control part 303 may include a UE (or mobile station) registration management function 307. The UE registration management function 307 stores a list of mobile stations permitted to connect to the local station. The list is, for example, a list of registered UE (or mobile station) numbers of mobile stations permitted to connect to the local station. Based on the stored list, the UE registration management function 307 performs, for example, at least one of the processes illustrated in FIG. 17 (S53), FIG. 18 (S57 and S58), and FIG. 19 (S63 and S64) described later.

The coding part 308 encodes transmission data and decodes received data.

The radio interface 309 is an interface that performs transmission processing and reception processing of signals transmitted and received to and from the mobile station 400.

(c) Example of the Mobile Station

Figure 6:
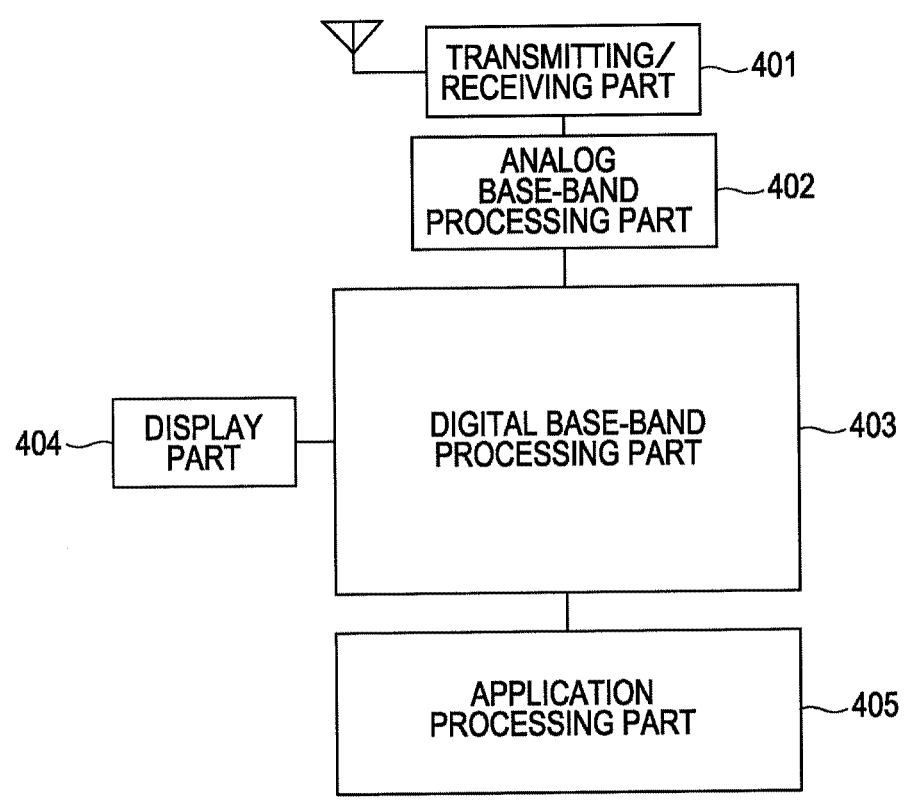
FIG. 6 illustrates an example of mobile station equipment used in the present embodiment.

FIG. 6 is an example of the mobile station equipment used in the present embodiment.

In FIG. 6, reference numeral 401 is a signal transmitting/receiving part, reference numeral 402 an analog base-band processing part, reference numeral 403 a digital base-band processing part, reference numeral 404 a display part, reference numeral 405 an application processing part.

The signal transmitting/receiving part 401 converts a received signal received via an antenna from a Radio Frequency (RF) signal of the carrier frequency into an Intermediate Frequency (IF) signal of an intermediate frequency and demodulates the signal by orthogonal detection. The signal transmitting/receiving part 401 also performs quadrature-modulation of a transmission signal and converts the IF signal into the RF signal of the carrier frequency to transmit the transmission signal via the antenna.

The analog base-band processing part 402 performs analog-digital conversion of a received signal to extract a base-band signal. The analog base-band processing part 402 also performs digital-analog conversion of a base-band signal for a transmission signal.

The digital base-band processing part 403 includes a Digital Signal Processor (DSP), Central Processing Unit (CPU), a memory, and the like.

The digital base-band processing part 403 encodes and decodes a base-band signal and performs processing such as encrypting/decrypting processing. In an upper layer, radio management protocol processing, call control, movement management, and the like are performed.

The digital base-band processing part 403 also performs processing concerning a handover. For example, signal quality measurements (for example, measurement of a signal to noise ratio) of adjacent cells are made based on broadcast information transmitted from a base station.

Further, the digital base-band processing part 403 generates various messages (for example, Measurement Report and Cell Update) transmitted in procedures for communication connection such as a handover and Cell Update.

The display part 404 includes, for example, a Liquid Crystal Display (LCD) and an LCD driver and displays data processed by the digital base-band processing part 403.

The application processing part 405 includes a CPU and memory and performs various kinds of software processing. Processing performed by the application processing part 405 includes, for example, software processing concerning a camera or card interface.

(3) First Embodiment

Figure 7:
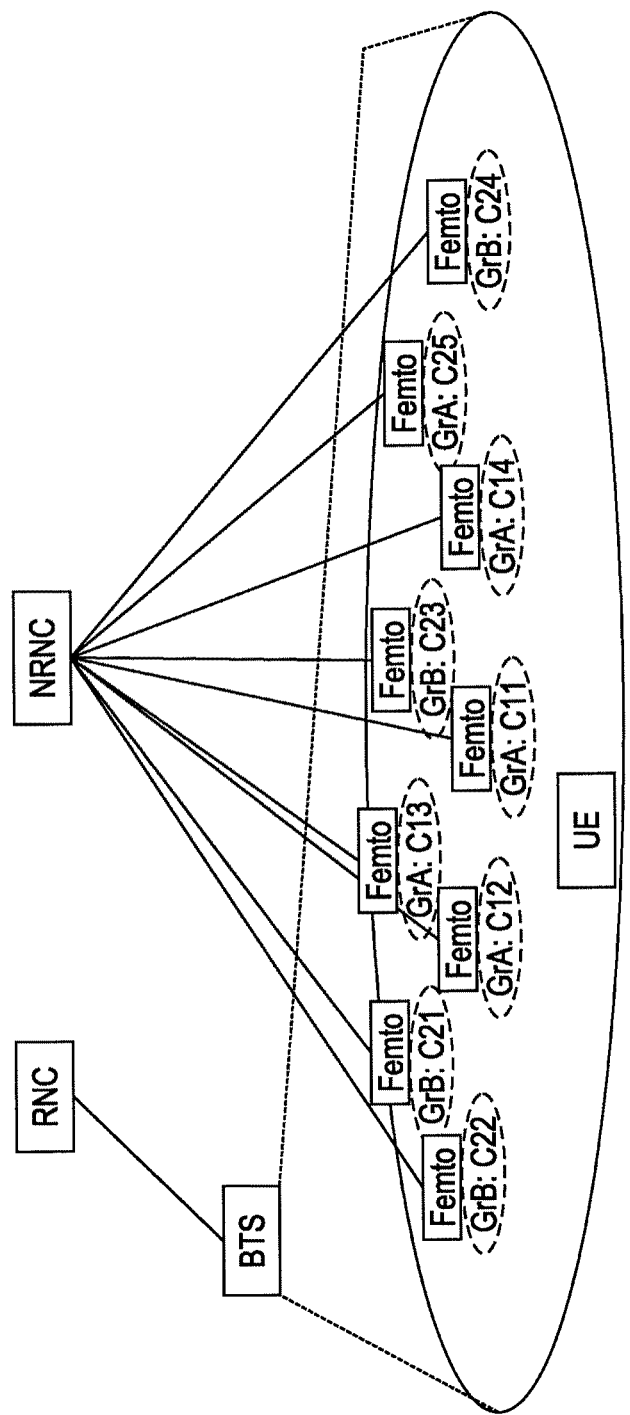
FIG. 7 illustrates an example of the communication system to which the present embodiment is applied.

FIG. 7 illustrates an example of the communication system to which the present embodiment is applied.

A base station (hereinafter, also denoted as BTS: Base Transceiver Station) of a macro cell performs communication with a mobile station (hereinafter, also denoted as UE: User Equipment) located in the macro cell.

Also, femtocells, which are communication areas of a plurality of femtocell base stations (hereinafter, also denoted as Femto), are present in the area of the macro cell. A femtocell number and a femtocell group name are set for each femtocell. For example, femtocells of the femtocell numbers C11 to C14 belong to femtocell group GrA and those of the femtocell numbers C21 to C25 belong to femtocell group GrB.

Hereinafter, a base station forming a femtocell Cnm with a femtocell number Cnm (n=1, 2, ..., m=1, 2, ...) may also be denoted as "FemtoCnm".

A BTS is controlled by an RNC, and FemtoC11 to FemtoC14 and FemtoC21 to FemtoC25 are controlled by an NRNC.

In the present embodiment, the NRNC stores a correspondence table in which, as illustrated in FIG. 8, the femtocell number, femtocell group name, and registered UE number (or UE-ID) are associated with each other.

Here, if a femtocell base station limits communication connections, a registered UE is a mobile station registered to be able to perform communication in the concerned femtocell, that is, permitted to connect to the base station forming the concerned femtocell.

The correspondence table in FIG. 8 illustrates, for example, that the femtocell C11 belongs to the femtocell group GrA, and a mobile station permitted to connect to the FemtoC11 is "N1".

Although FIG. 8 illustrates a case in which one mobile station is registered for each femtocell, a plurality of mobile stations may also be registered for each femtocell. Moreover, a mobile station may be registered for a plurality of femtocells.

Figure 9:
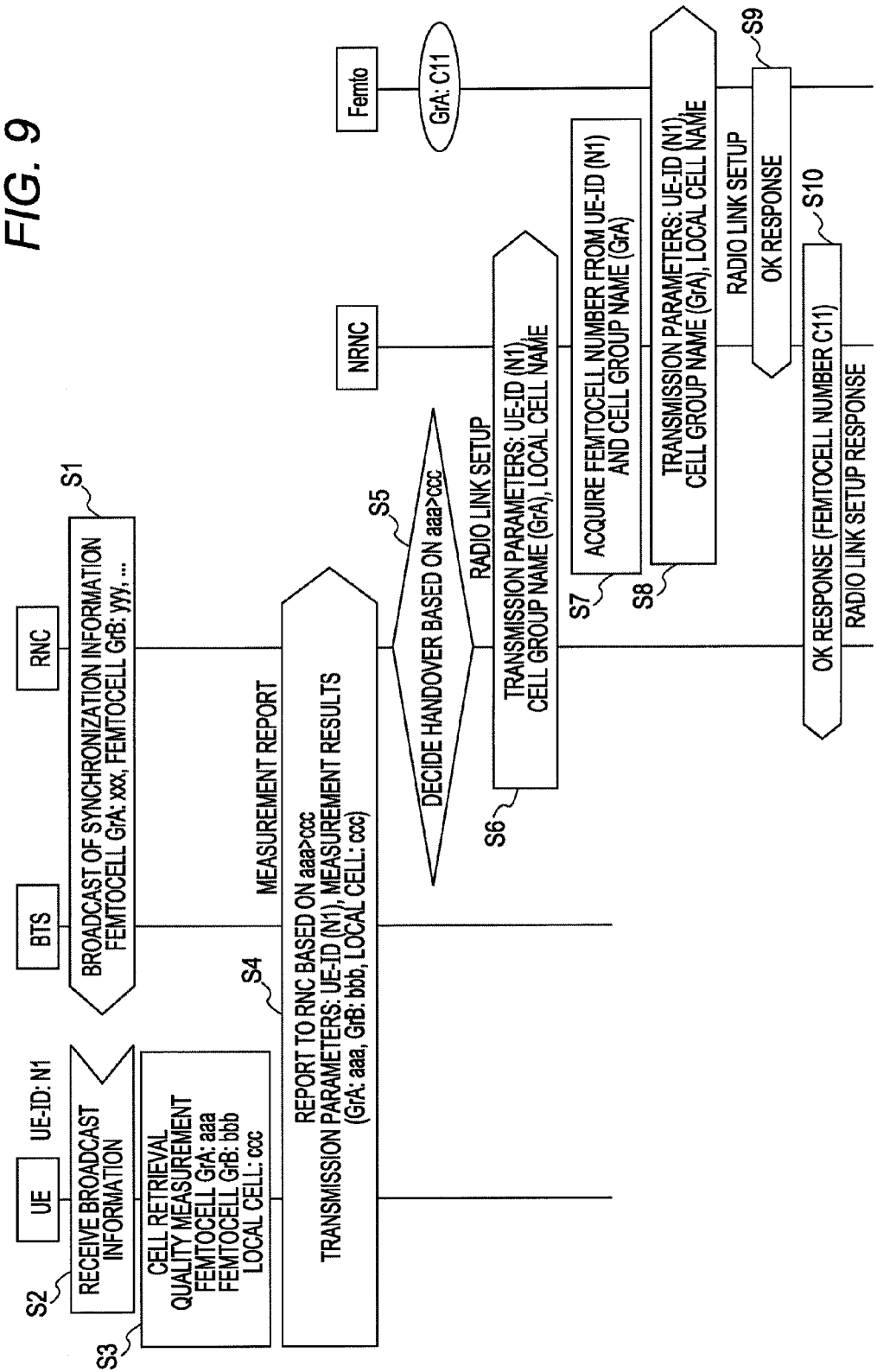
FIG. 9 illustrates a flow of a handover in the first embodiment.

FIG. 9 illustrates the flow of a handover in the first embodiment.

At S1, the BTS transmits synchronization information about adjacent cells including femtocells to mobile stations located in the macro cell following instructions from the RNC. Here, synchronization information sent by the BTS is information about each femtocell group (for example, GrA and GrB), instead of individual femtocells.

At S2, mobile stations receive the broadcast information sent by the BTS at S1.

At S3, the mobile station makes quality measurements of the received signals for the femtocell groups GrA and GrB and the macro cell (hereinafter, referred to as "macro cell X") in which the mobile station is located based on information contained in the broadcast information received at S2. For example, the signal to noise ratio (SN ratio) of signals of the frequency corresponding to each femtocell group is measured. In FIG. 9, the value indicating quality is "aaa" for the femtocell group GrA, "bbb" for the femtocell group GrB, and "ccc" for a macro cell "X". Here, an increasing value showing quality means better communication quality of the concerned cell.

At S4, if the mobile station detects that the value of the signal quality of the femtocell group GrA is greater than that of the signal quality of the macro cell "X" (aaa>ccc), the mobile station transmits a Measurement Report to the RNC via the BTS. Parameters transmitted from the mobile station to the RNC with the Measurement Report include UE-ID "N1" and quality measurement results "GrA: aaa, GrB: bbb, X: ccc".

At S5, based on parameters received with the Measurement Report at S4, the RNC determines that aaa>ccc and decides to execute a handover from the cell X to a femtocell belonging to the femtocell GrA.

At S6, the RNC transmits a Radio Link Setup to the NRNC. Parameters transmitted from the RNC to the NRNC with the Radio Link Setup include UE-ID "N1", the femtocell group name "GrA", and the local cell name "X".

At S7, the NRNC references the correspondence table in FIG. 8 stored in the local equipment to determine whether the femtocell number corresponding to UE-ID and the femtocell group name of parameters received with the Radio Link Setup is present; that is, whether a femtocell formed by a base station permitted to connect a mobile station indicated by UE-ID is present in the femtocell group. In FIG. 9, the femtocell number "C11" corresponding to "N1" and "GrA" is acquired.

At S8, based on the femtocell number acquired at S7, the NRNC transmits the Radio Link Setup to the FemtoC11.

Parameters transmitted from the NRNC to the femtocell C11 with the Radio Link Setup include UE-ID "N1", the femtocell group name "GrA", and the local cell name "X".

At S9, the FemtoC11 sends back a response by transmitting a Radio Link Setup Response to the NRNC in response to the Radio Link Setup received at S8.

At S10, the NRNC transfers the Radio Link Setup Response received at S9 to the RNC. With the transfer of the Radio Link Setup Response, the RNC is notified of the femtocell number "C11".

With the above procedure, the RNC can perform a procedure of a handover to a femtocell formed by a base station permitted to connect to the mobile station.

The procedure of a handover after the RNC is notified of the femtocell number contains, for example, steps below illustrated in FIGS. 10 and 11.

Figure 10:
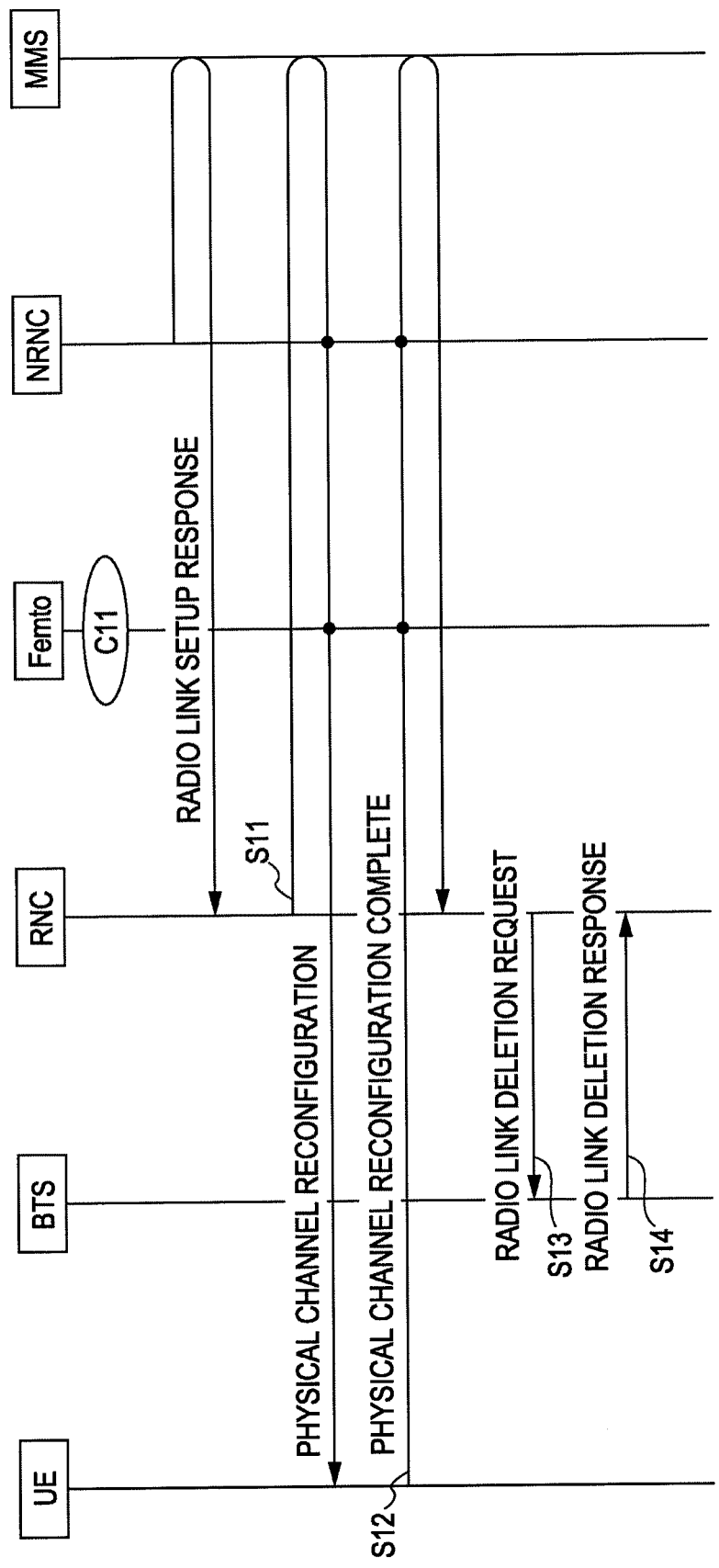
FIG. 10 illustrates an example of a handover procedure (when the handover is successful) in the first embodiment.
Figure 11:
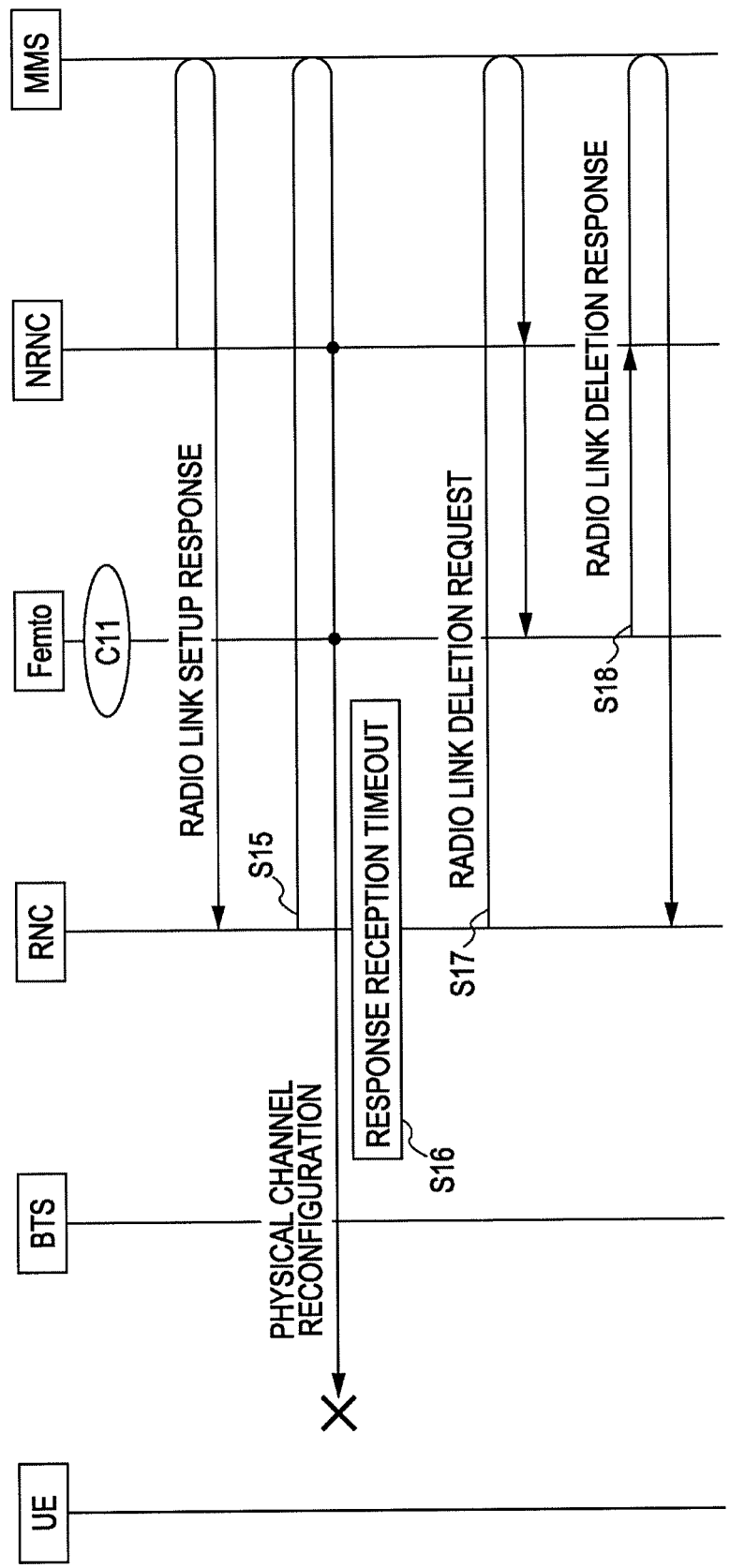
FIG. 11 illustrates an example of the handover procedure (when the handover fails) in the first embodiment.

In FIGS. 10 and 11, the RNC transmits a Physical Channel Reconfiguration for notification of physical channel setting changes to the mobile station via the NRNC and the FemtoC11 (S11, S15).

In FIG. 10, if the mobile station is located in the communication area of the FemtoC11 and the Physical Channel Reconfiguration is successfully received, the mobile station sends back a response by transmitting a Physical Channel Reconfiguration Complete to the RNC via the FemtoC11 (S12).

After receiving the Physical Channel Reconfiguration Complete transmitted from the mobile station, the RNC transmits a Radio Link Deletion Request to the BTS (S13).

After receiving the Radio Link Deletion Request, the BTS sends back a response by transmitting a Radio Link Deletion Response to the RNC to release connection to the mobile station (S14).

In FIG. 11, if, on the other hand, the mobile station is not located in the communication area of the FemtoC11 and the Physical Channel Reconfiguration cannot be received, a handover failure is detected by the RNC based on a response reception timeout (S16).

The RNC transmits a Radio Link Deletion Request to the FemtoC11 via the NRNC (S17).

After receiving the Radio Link Deletion Request, the FemtoC11 sends back a response by transmitting a Radio Link Deletion Response to the RNC via the NRNC to release connection to the mobile station (S18).

(4) Modification of the First Embodiment

The first embodiment described above is mainly applied when the protocol state of Radio Resource Control (RRC) is in a Dedicated Channel (Cell_DCH) state, that is, individual channels are allocated to mobile stations and voice data and packet data can be transmitted and received by Downlink and Uplink.

On the other hand, the present embodiment may also be applied to a Forward Access Channel (Cell_FACH) state or a Paging Channel (Cell_PCH) state.

Here, in the Cell_FACH state, individual channels are not allocated to mobile stations and each mobile station can receive control information and user data by FACH in a Downlink and transmit packet data at any time by common channels in an Uplink. In the Cell_PCH state, individual channels are not allocated to mobile stations and each mobile station receives user data by PCH in the Downlink and transmits data according to a specific procedure in the Uplink because mobile stations do not have any channel for normal data transmission.

When moving between cells in the Cell_FACH state or Cell_PCH state, a mobile station does not request a handover, but performs a Cell Update that notifies a network of cell updates.

The present embodiment will be described below by taking a case in which a mobile station that receives data in a macro cell in a communication system similar to the one in FIG. 7 moves into a femtocell sharing a communication area with the macro cell as an example.

In the present embodiment, like the first embodiment, the NRNC stores a correspondence table, as illustrated in FIG. 8, which associates the femtocell number, femtocell group name, and registered UE number (or UE-ID) with each other.

Figure 12:
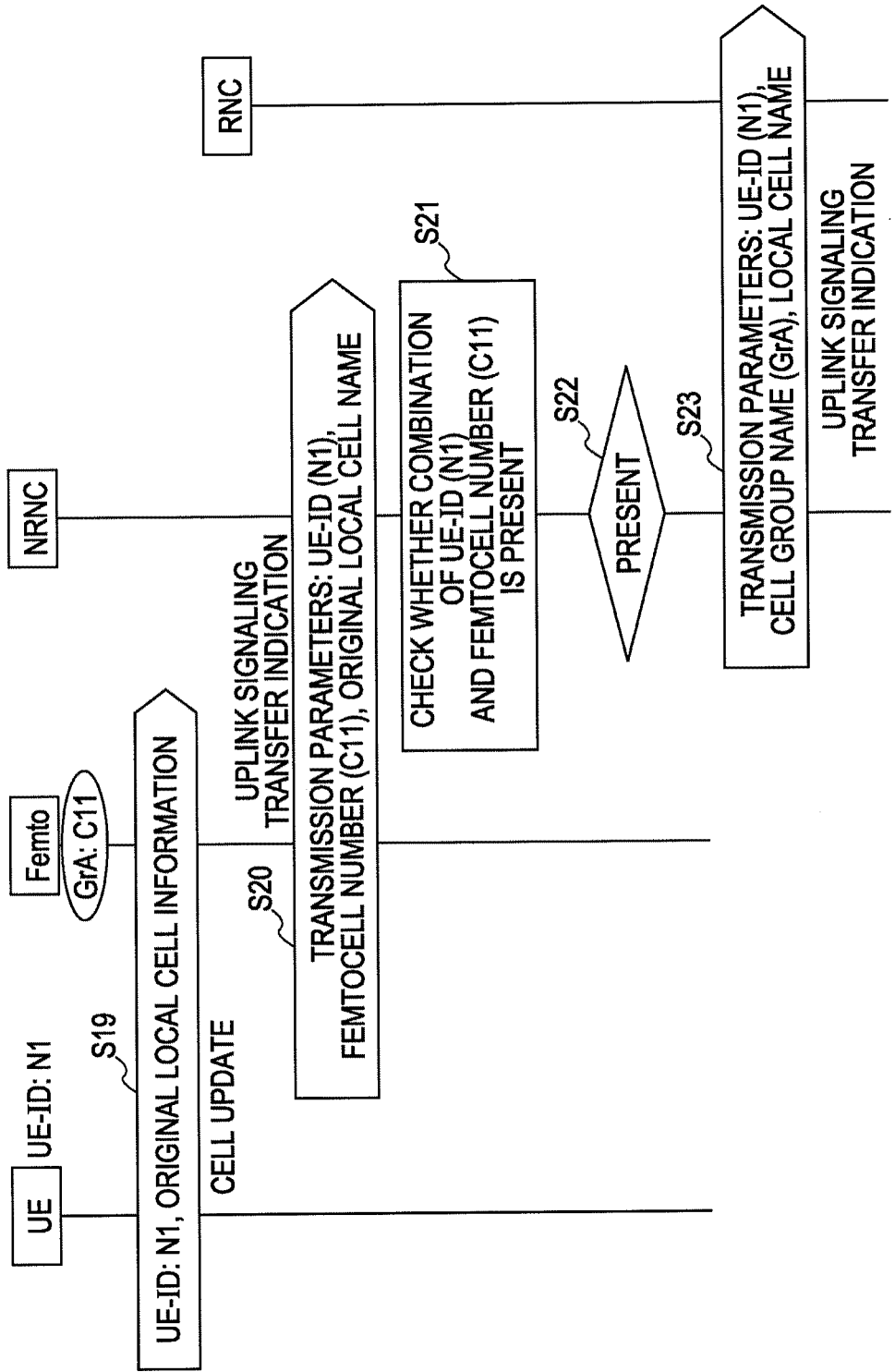
FIG. 12 illustrates a Cell Update flow (when the Cell Update is successful) in the modification of the first embodiment.

FIG. 12 illustrates the flow of a Cell Update in the present embodiment.

At S19, the mobile station transmits the Cell Update to the destination FemtoC11. With the Cell Update, UE-ID "N1" and the original local cell information (for example, information about the macro cell "X") are transmitted from the mobile station to the FemtoC11.

At S20, based on the Cell Update received at S19, the FemtoC11 transmits an Uplink Signaling Transfer Indication to the NRNC. Parameters transmitted from the FemtoC11 to the NRNC with the Uplink Signaling Transfer Indication include UE-ID "N1", the femtocell number "C11", and the original local cell name "X".

At S21, the NRNC references the correspondence table in FIG. 8 stored in the local equipment to determine whether or not there is any combination corresponding to UE-ID and the femtocell number of parameters received with the Uplink Signaling Transfer Indication at S20; that is, whether or not the mobile station indicated by the concerned UE-ID is permitted to connect to the base station forming the femtocell indicated by the femtocell number is determined. In FIG. 12, whether or not there is any combination corresponding to UE-ID "N1" and the femtocell number "C11" is determined.

At S22, the NRNC determines that the combination of UE-ID "N1" and the femtocell number "C11" is present in the correspondence table. If the combination is determined to be present, the NRNC references the correspondence table to acquire the femtocell group name "GrA" corresponding to the femtocell number "C11".

At S23, based on the original local cell name "X" indicated by parameters received with the Uplink Signaling Transfer Indication at S20, the NRNC transmits the Uplink Signaling Transfer Indication to the RNC corresponding to the macro cell "X". Parameters transmitted from the NRNC to the RNC with the Uplink Signaling Transfer Indication include UE-ID "N1", the femtocell group name "GrA", and the local cell name "X".

With the above procedure, the RNC can perform the procedure of the Cell Update on a femtocell formed by a base station permitted to connect to the mobile station.

Figure 13:
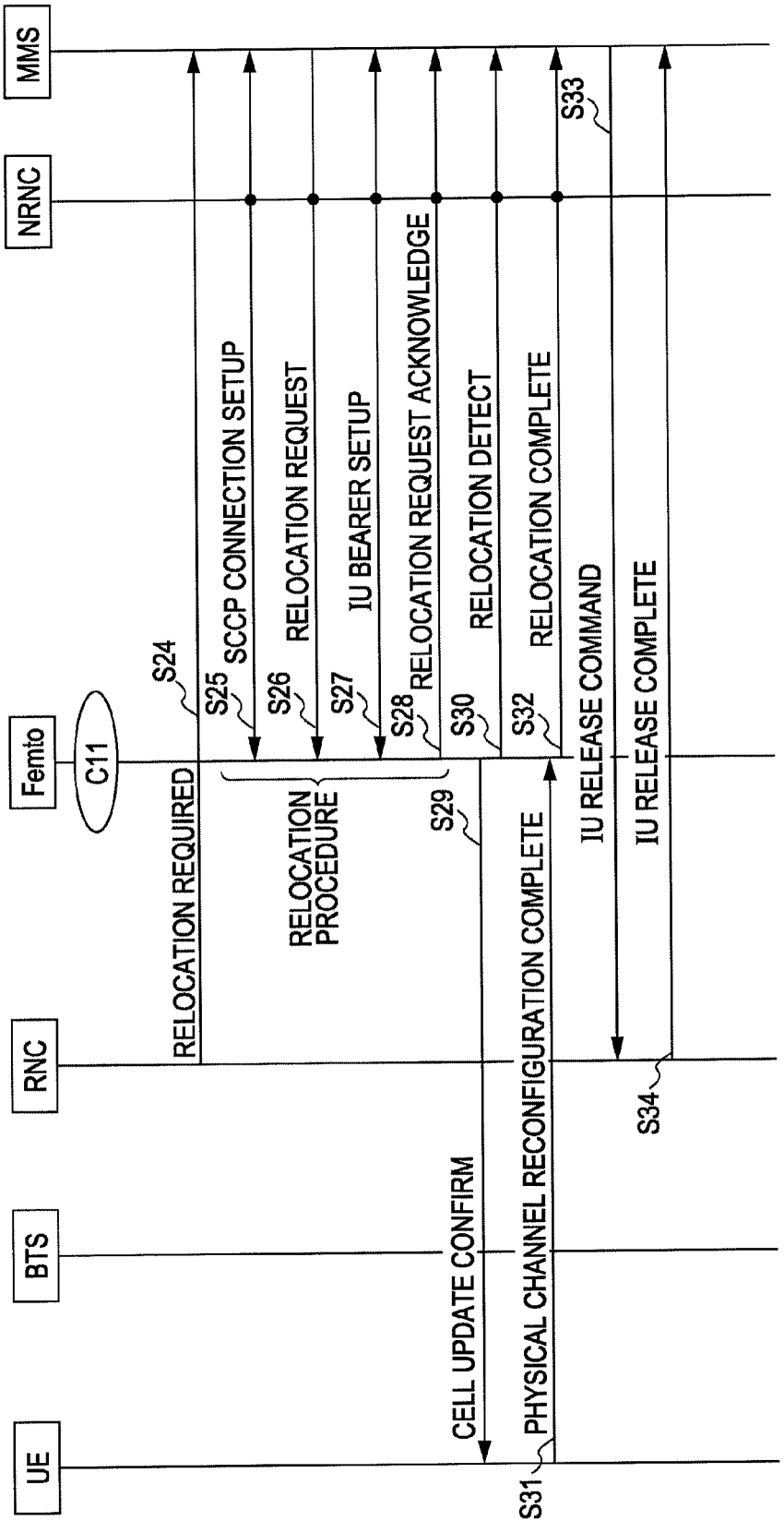
FIG. 13 illustrates an example of a Cell Update procedure (when the Cell Update is successful) in the modification of the first embodiment.

The procedure of the Cell Update after RNC receives the Uplink Signaling Transfer Indication includes, for example, the following steps illustrated in FIG. 13.

In FIG. 13, the RNC that has received the Uplink Signaling Transfer Indication determines whether a Relocation to change the base station controller that manages mobile stations should be performed. If the RNC determines that the Relocation should be performed, the RNC transmits a Relocation Required to a Multimedia Messaging Service (MMS) of an upper node (S24).

After receiving the Relocation Required from the RNC, the MMS performs a Relocation Procedure with the FemtoC11 via the NRNC. In the Relocation Procedure, an SCCP Connection Setup (S25), a Relocation Request (S26), an Iu Bearer Setup (S27), and a Relocation Request Acknowledge (S28) are transmitted and received.

The FemtoC11 notifies the mobile station of a Cell Update Confirm (S29). The FemtoC11 also notifies the upper node of a Relocation Detect (S30).

The mobile station that has received the Cell Update Confirm notifies the FemtoC11 of a Physical Channel Reconfiguration Complete.

After receiving the Physical Channel Reconfiguration Complete, the FemtoC11 transmits a Relocation Complete for notification of completion of the Relocation to the upper node (S32).

After being notified of completion of the Relocation, the MMS transmits an Iu Release Command that requests a release of the link of the Iu interface to the RNC (S33). After receiving the Iu Release Command, the RNC releases the link of the Iu interface to the MMS.

Figure 14:
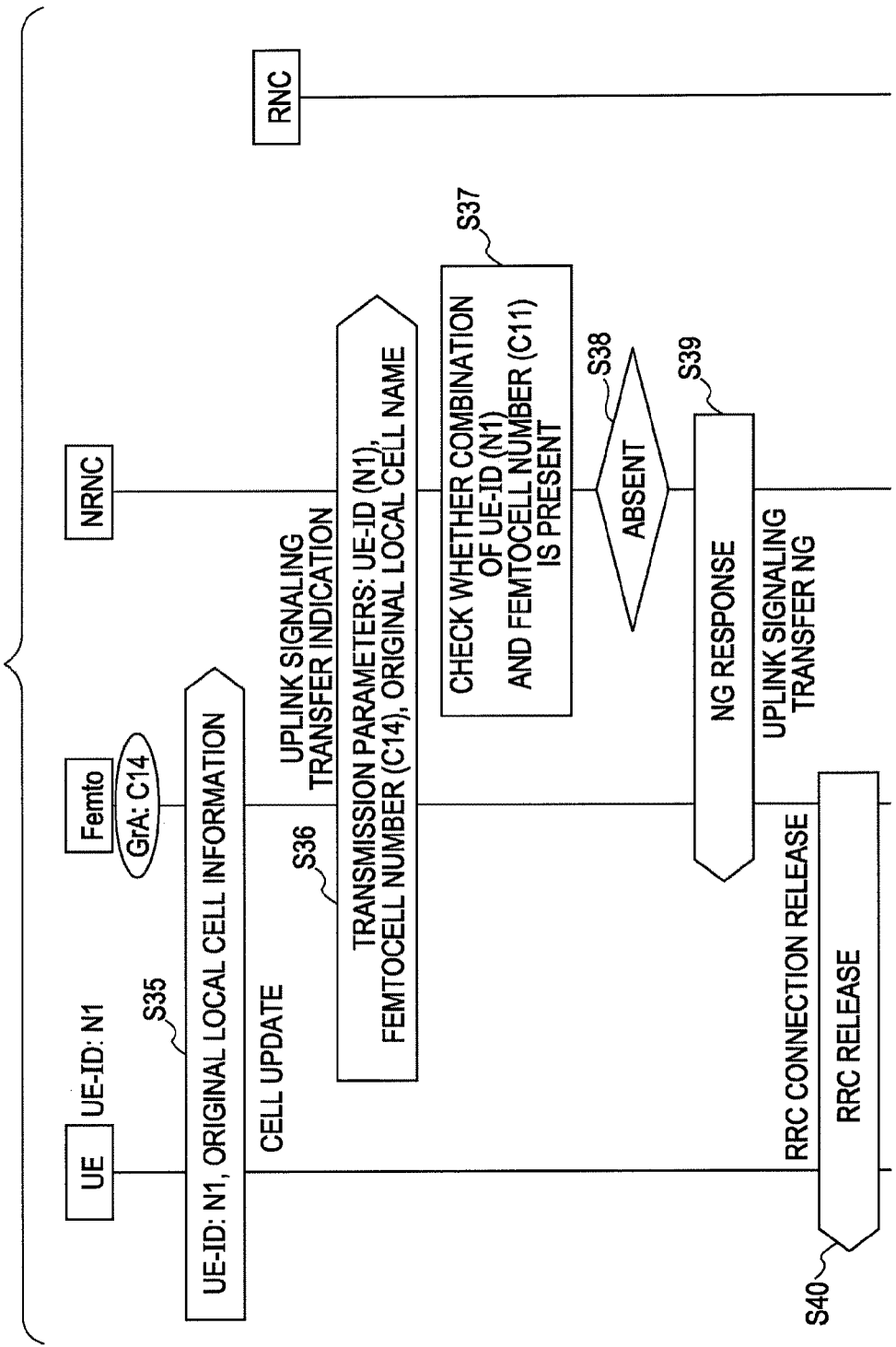
FIG. 14 illustrates the Cell Update flow (when the Cell Update fails) in the modification of the first embodiment.

On the other hand, FIG. 14 illustrates the flow when the FemtoC14 requested by a mobile station to perform the Cell Update does not permit connection to the mobile station due to connection limitations.

At S35, the mobile station transmits the Cell Update to the destination the FemtoC14. With the Cell Update, UE-ID "N1" and the original local cell information (for example, information about the macro cell X) are transmitted from the mobile station to the FemtoC14.

At S36, based on the Cell Update received at S35, the FemtoC14 transmits the Uplink Signaling Transfer Indication to the NRNC. Parameters transmitted from the FemtoC14 to the NRNC with the Uplink Signaling Transfer Indication include UE-ID "N1", the femtocell number "C14", and the original local cell name "X".

At S37, the NRNC references the correspondence table in FIG. 8 stored in the local equipment to determine whether or not there is any combination corresponding to UE-ID and the femtocell number of parameters received with the Uplink Signaling Transfer Indication at S36. In FIG. 14, whether or not there is any combination corresponding to UE-ID "N1" and the femtocell number "C14" is determined.

At S38, the NRNC determines that the combination of UE-ID "N1" and the femtocell number "C14" is "absent" in the correspondence table.

At S39, the NRNC transmits an Uplink Signaling Transfer NG to the FemtoC14 to notify the FemtoC14 that the Cell Update between the mobile station and Femtoc14 has failed.

At S40, since the FemtoC14 cannot establish a link to the mobile station, the FemtoC14 notifies the mobile station of a RRC Connection Release.

With the above procedure, it becomes possible to perform processing so that the procedure for the Cell Update is not performed on a femtocell formed by a base station to which the connection from mobile stations is limited.

Figure 15:
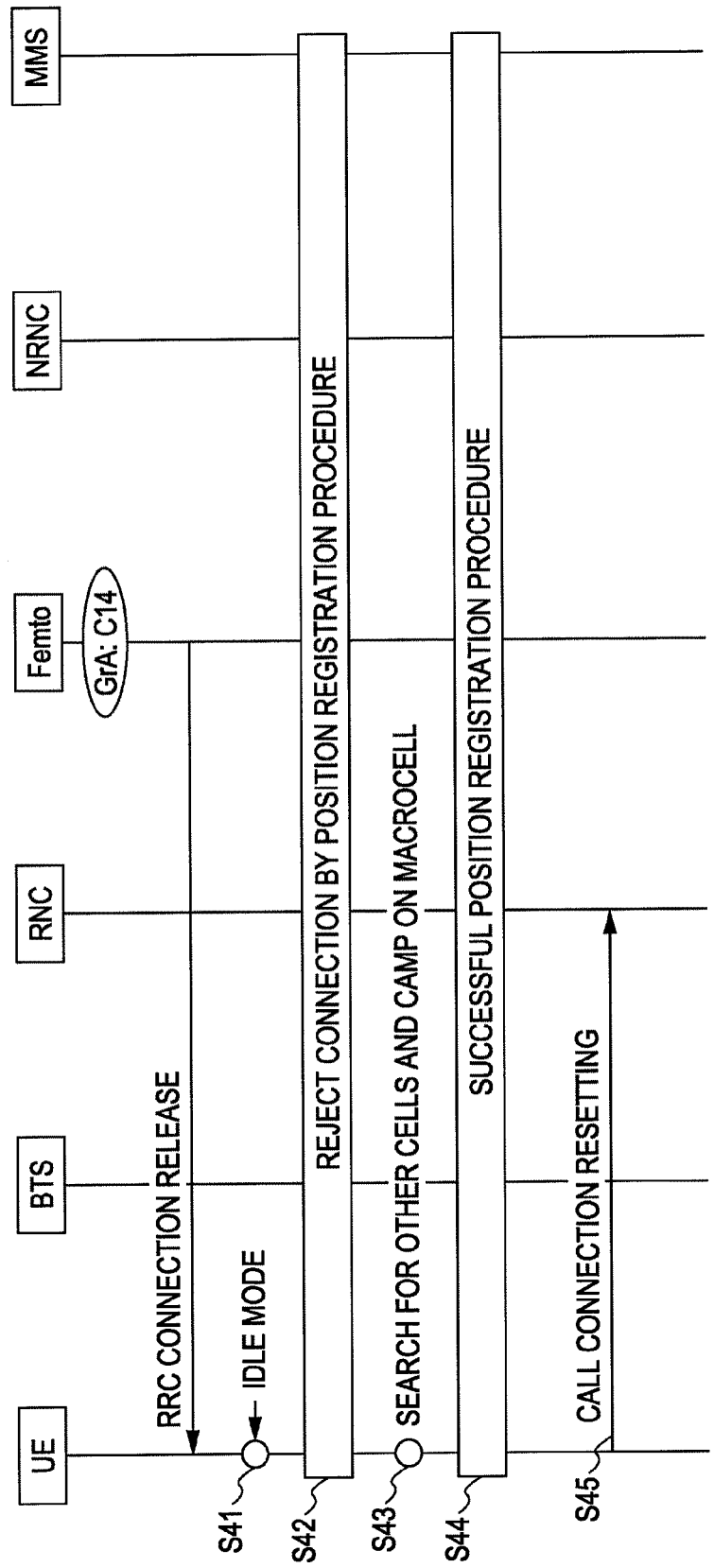
FIG. 15 illustrates an example of the Cell Update procedure (when the Cell Update fails) in the modification of the first embodiment.

FIG. 15 illustrates an example of the flow up to the point the mobile station that has failed in the Cell Update to the femtocell in FIG. 14 secures the connection to the macro cell base station again.

The mobile station that has received a RRC Connection Release enters into an idle state (S41).

The mobile station starts a position registration procedure with the FemtoC14, but because the FemtoC14 is not allowed to establish a connection with the concerned base station due to connection limitations, the FemtoC14 performs a procedure to reject the connection in response to the position registration request from the concerned mobile station (S42).

The mobile station for which the connection is rejected by the FemtoC14 searches for cells and camps on the macro cell "X" (S43).

The mobile station makes a position registration request to the macro cell "X" again and completes the position registration procedure (S44). The mobile station performs the Cell Update procedure in the macro cell "X" to reset the call connection (S45).

(5) Second Embodiment

The communication system to which the present embodiment is applied is assumed to be the same as that illustrated in FIG. 7.

In the present embodiment, the NRNC stores a correspondence table, as illustrated in FIG. 16, which associates the femtocell number and femtocell group name.

The correspondence table in FIG. 16 illustrates, for example, that the femtocell C11 belongs to the femtocell group GrA.

Also in the present embodiment, each femtocell base station (Femto) stores a list of users who register that communication is performed with the local station, that is, a list of registered UE (or mobile station) numbers (UE-ID). The number of mobile stations registered for each femtocell may be one or more. Further, a mobile station may be registered for a plurality of femtocells.

Figure 17:
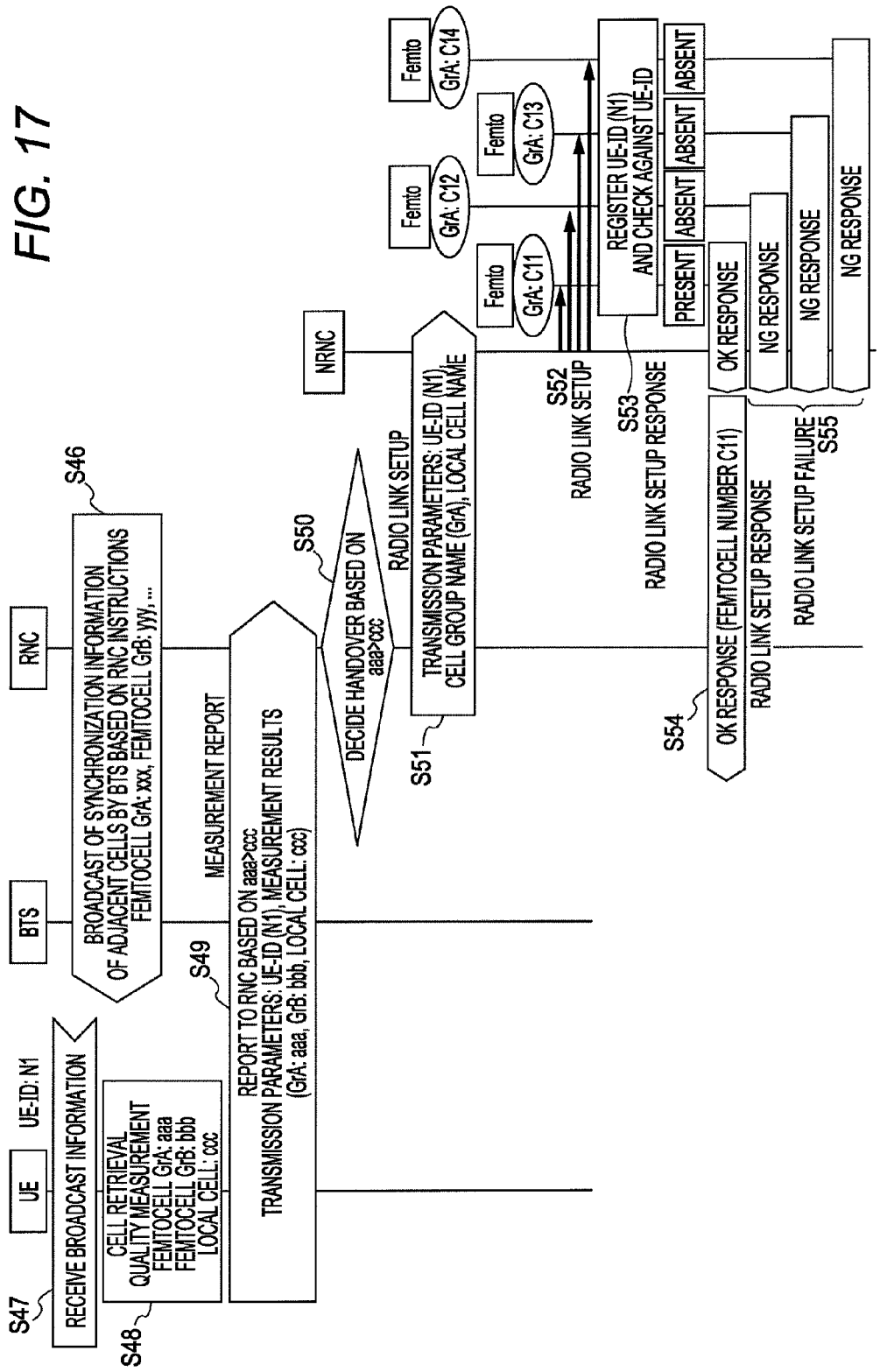
FIG. 17 illustrates the flow of a handover in the second embodiment.

FIG. 17 illustrates the flow of a handover in the present embodiment.

At S46, the BTS transmits synchronization information about adjacent cells including femtocells to mobile stations located in the macro cell following instructions from the RNC. Here, synchronization information sent by the BTS is information about each femtocell group (for example, GrA and GrB), instead of individual femtocells.

At S47, mobile stations receive the broadcast information sent by the BTS at S46.

At S48, the mobile station makes quality measurements of received signals for the femtocell groups GrA and GrB and the local macro cell (for example, the macro cell "X") based on information contained in the broadcast information received at S47. For example, the signal to noise ratio (SN ratio) of signals of the frequency corresponding to each femtocell group may be measured. In FIG. 17, the value indicating quality is "aaa" for the femtocell group GrA, "bbb" for the femtocell group GrB, and "ccc" for a macro cell X.

At S49, if the mobile station detects that the value of the signal quality of the femtocell group GrA is greater than that of the signal quality of the macro cell "X" (aaa>ccc), the mobile station transmits a Measurement Report to the RNC via the BTS. Parameters transmitted from the mobile station to the RNC with the Measurement Report include UE-ID "N1" and the quality measurement results "GrA: aaa, GrB: bbb, X: ccc".

At S50, based on parameters received with the Measurement Report at S49, the RNC determines that aaa>ccc and decides to execute a handover from the macro cell "X" to a femtocell belonging to the femtocell group GrA.

At S51, the RNC transmits a Radio Link Setup to the NRNC. Parameters transmitted from the RNC to the NRNC with the Radio Link Setup include UE-ID "N1", the femtocell group name "GrA", and the local cell name "X".

At S52, the NRNC references the correspondence table in FIG. 16 stored in the local equipment to transmit the Radio Link Setup to all femtocell base stations of femtocell cell numbers corresponding to the femtocell group name indicated by parameters received with the Radio Link Setup at S51. In FIG. 17, the NRNC transmits the Radio Link Setup to each of the base stations FemtoC11, FemtoC12, FemtoC13, and FemtoC14 of the femtocell numbers "C11", "C12", "C13", and "C14" corresponding to "GrA".

At S53, FemtoC11 to FemtoC14 reference the user list stored in the local station to determine whether UE-ID "N1" indicated by parameters received with the Radio Link Setup is present in the concerned list. In FIG. 17, the FemtoC11 determines that UE-ID "N1" is present in the list and the FemtoC12 to 14 determine that UE-ID "N1" is absent in the list.

At S54, the FemtoC11 sends back a response by transmitting a Radio Link Setup Response to the NRNC in response to the Radio Link Setup received at S53. Also, since the NRNC transfersthe Radio Link Setup Response received by the NRNC to the RNC, the RNC is notified of the femtocell number "C11".

At S55, FemtoC12 to 14 each transfer a Radio Link Setup Failure to the NRNC.

With the above procedures, the RNC can perform the procedure of a handover to a femtocell formed by a base station permitted to connect to the mobile station.

The execution of a handover after the RNC is notified of the femtocell number includes, for example, steps similar to those in FIG. 10 or 11.

(6) Modification of the Second Embodiment

The present embodiment illustrates an example of processing when a mobile station performs a Cell Update in a communication system similar to the processing in the second embodiment.

The present embodiment will be described below by describing an example in which a mobile station that receives data in a macro cell in a communication system similar to the one in FIG. 7 moves into a femtocell sharing a communication area with the macro cell.

In the present embodiment, like the first embodiment, the NRNC stores a correspondence table, as illustrated in FIG. 16, which associates femtocell numbers with femtocell group names.

Also in the present embodiment, each femtocell base station (Femto) stores a list of users registered to perform communication with the local station, that is, a list of registered UE (or mobile station) numbers (UE-ID). The number of mobile stations registered for each femtocell may be one or more. Further, a mobile station may be registered for a plurality of femtocells.

Figure 18:
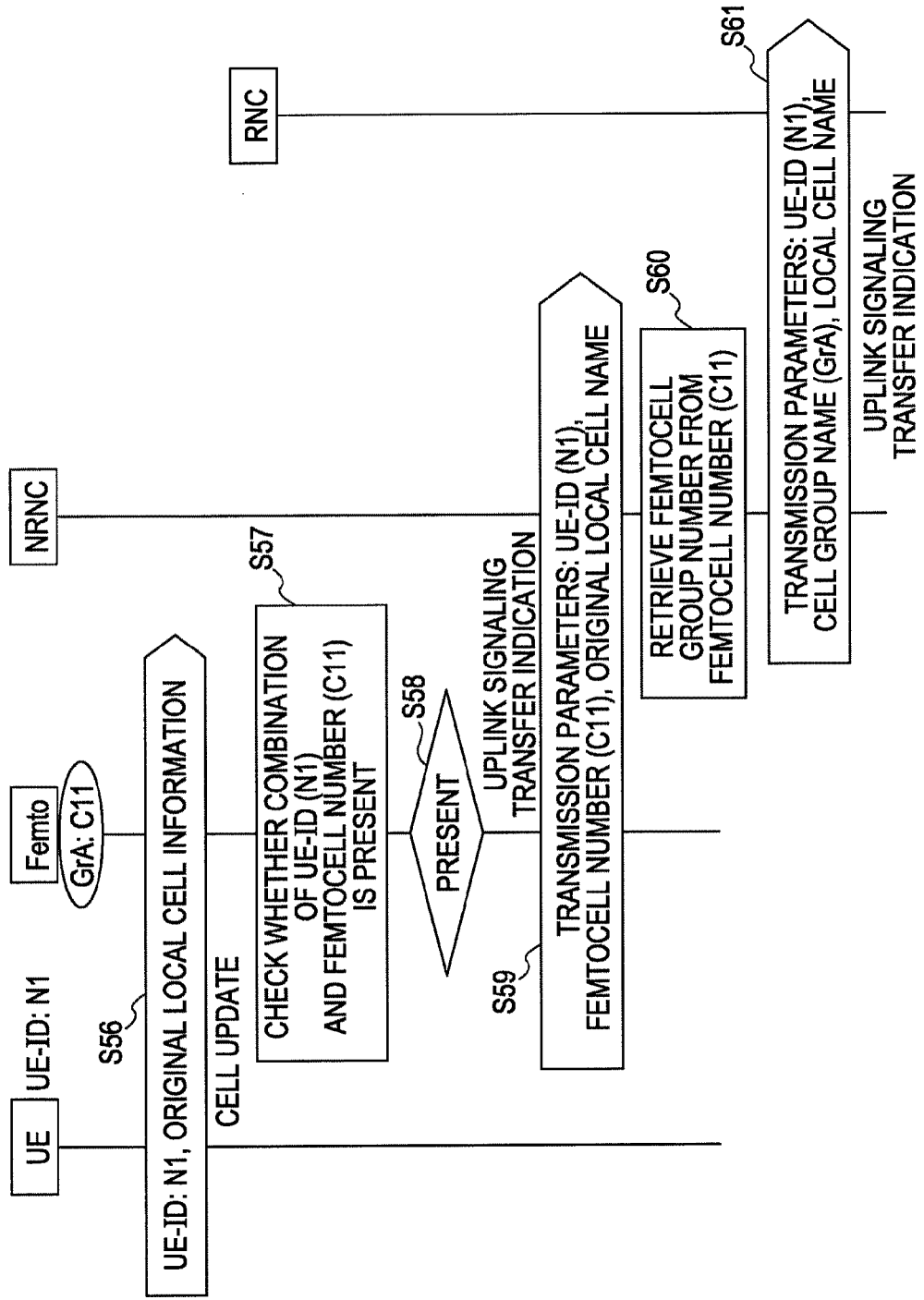
FIG. 18 illustrates the Cell Update flow (when the Cell Update is successful) in the modification of the second embodiment.

FIG. 18 illustrates the flow of a Cell Update in the present embodiment.

At S56, the mobile station transmits the Cell Update to the destination FemtoC11. With the Cell Update, UE-ID "N1" and the original local cell information (for example, information about the macro cell "X") are transmitted from the mobile station to the FemtoC11.

At S57, the FemtoC11 references the user list stored in the local station to determine whether UE-ID "N1" indicated by parameters received with the Cell Update is present in the concerned list.

At S58, the FemtoC11 determines that UE-ID "N1" is present in the list.

At S59, based on the Cell Update received at S57, the FemtoC11 transmits an Uplink Signaling Transfer Indication to the NRNC. Parameters transmitted from the FemtoC11 to the NRNC with the Uplink Signaling Transfer Indication include UE-ID "N1", the femtocell number "C11", and the original local cell name "X".

At S60, the NRNC references the correspondence table in FIG. 16 stored in the local station to retrieve the femtocell group name corresponding to the UE-ID and the femtocell number parameters received with the Uplink Signaling Transfer Indication at S59. In FIG. 18, the NRNC retrieves the femtocell group name corresponding to the femtocell number "C11" to acquire the femtocell group name "GrA".

At S61, based on the original local cell name "X" indicated by the parameters received with the Uplink Signaling Transfer Indication at S60, the NRNC transmits the Uplink Signaling Transfer Indication to the RNC corresponding to the macro cell "X". Parameters transmitted from the NRNC to the RNC with the Uplink Signaling Transfer Indication include UE-ID "N1", the femtocell group name "GrA", and the local cell name "X".

With the above procedure, the RNC can perform the procedure of Cell Update to a femtocell formed by a base station permitted to connect to the mobile station.

The procedure for the Cell Update after the Uplink Signaling Transfer Indication is received by the RNC includes, for example, steps similar to those in FIG. 13.

On the other hand, FIG. 19 illustrates a flow when the FemtoC14 requested by a mobile station to perform a Cell Update does not permit a connection to the mobile station due to connection limitations.

At S62, a mobile station transmits a Cell Update to the FemtoC14 forming the destination femtocell. With the Cell Update, UE-ID "N1" and the original local cell information (for example, information about the macro cell X) are transmitted from the mobile station to the FemtoC14.

At S63, the FemtoC14 references the user list stored in the local station to determine whether UE-ID "N1" indicated in the parameters received with the Cell Update is present in the concerned list.

At S64, the FemtoC14 determines that UE-ID "N1" is absent in the list.

At S65, since the FemtoC14 cannot establish a link to the mobile station, the FemtoC14 notifies the mobile station of an RRC Connection Release.

With the above procedure, it may be possible to perform processing so that the procedure for a Cell Update is not performed on a femtocell formed by a base station to which the connection from mobile stations is limited.

The flow of the procedure for the mobile station that has failed in the Cell Update to a femtocell in FIG. 19 to reconnect to the macro cell base station is similar to the flow illustrated in, for example, FIG. 15.

(7) Others

The present embodiment may be applied, as an example, to a communication system in which a macro cell and femtocells share a communication area, but is not limited to such an example and may be applied to a communication system including general cells such as micro cells and pico cells sharing a communication area.

The identification of femtocells, femtocell groups, and registered UE is not limited to the numbers or symbols illustrated in the above embodiments and other identification information may be used.

The present embodiment can be applied to, for example, a communication system such as an IMT-2000.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A base station controller that manages a plurality of cells, the base station controller comprising:
   a receiver configured to receive, from another base station controller that manages a cell having a communication area that encompasses each of the plurality of cells, identification information of a mobile station connected to a base station under control of the another base station controller, and identification information of one of a plurality of cell groups to which a cell, among the plurality of cells belonging to the plurality of cell groups, formed by a base station as a connection destination candidate of the mobile station belongs; and
   a processor configured
      to determine a connection cell that the mobile station connects to among the plurality of cells, the connection cell belonging to the cell group identified by the cell group identification information and formed by a connection base station that determines whether to permit a connection to the mobile station based on the identification information of the mobile station, and
      to control the connection base station forming the connection cell to transmit a message requesting connection to the mobile station, wherein
   the another base station controller transmits information regarding each of the plurality of cell groups to the mobile station.

2. The base station controller according to claim 1, wherein, if no cell formed by the base station permitting connection to the mobile station among the plurality of cells belonging to the cell group determined by the identification information of the cell group is determined, the processor controls not to allow transmission, to the base station forming any cell belonging to the cell group, of a message requesting connection to the mobile station.

3. The base station controller according to claim 1, wherein when a message notifying the processor of permission to connect to the mobile station is received from the determined base station forming the cell, the processor controls to allow transmission of the message to the another base station controller by including an identifier of the cell in the message.

4. The base station controller according to claim 1, wherein the processor has a correspondence table associating, with each other, identification information of the mobile station, identification information of the cell formed by the base station permitting connection to the mobile station, and identification information of the cell group in which the cell formed by the base station permitting the connection is contained, and determines the cell based on the correspondence table.

5. A base station controller that manages a plurality of cells belonging to a plurality of cell groups, the base station controller comprising:
   a receiver configured to receive, from another base station controller that manages a cell having a communication area that encompasses each of the plurality of cells, identification information of one of the plurality of cell groups to which a cell formed by a base station of connection destination candidate of a mobile station connected to a base station under control of the another base station controller belongs; and
   a processor configured to control to transmit a message requesting connection to the mobile station to each base station forming the cells contained in the cell group,
   wherein each base station determines whether to permit a connection to the mobile station based on the identification information of the mobile station, and
   the another base station controller transmits information regarding each of the plurality of cell groups to the mobile station.

6. The base station controller according to claim 5, wherein when a message notifying the processor of permission to connect to the mobile station is received from one of the cells contained in the cell group, the processor controls to allow transmission of the message to the another base station controller by including identification information of the cell in the message.

7. The base station controller according to claim 5, wherein the processor has a correspondence table associating identification information of the cell group with identification information of the cell contained in the cell group, and controls to transmit a message, requesting connection to the mobile station connected to the base station forming the cell under the another base station controller, to the base station forming each cell contained in the cell group based on the correspondence table.

8. A base station that forms one of a plurality of cells belonging to a plurality of cell groups managed by a base station controller, the base station comprising:
   a receiver configured to receive, from the base station controller, identification information of a mobile station connected to a base station under control of an another base station controller that manages a cell having a communication area that encompasses each of the plurality of cells; and
   a processor configured to determine whether to permit a connection to the mobile station to based on the identification information of the mobile station, and to control to transmit a message of notification that connection to the determined mobile station is permitted to the another base station controller via the base station controller, wherein
   the another base station controller transmits information regarding each of the plurality of cell groups to the mobile station.

9. The base station according to claim 8, wherein when a mobile station not permitted to connect to the local station is determined based on the identification information of the mobile station, the processor controls to transmit a message of notification that connection to the mobile station is not permitted to the base station controller.

* * * * *